(12) United States Patent
Wix et al.

(10) Patent No.: US 10,549,991 B2
(45) Date of Patent: Feb. 4, 2020

(54) METHOD FOR PRODUCTION OF A HYDROGEN RICH GAS

(71) Applicant: HALDOR TOPSØE A/S, Kgs. Lyngby (DK)

(72) Inventors: Christian Wix, Nærum (DK); Ib Dybkjær, Copenhagen Ø (DK); Rasmus Trane-Restrup, Roskilde (DK)

(73) Assignee: HALDOR TOPSØE A/S4, Kgs. Lyngby (DK)

( * ) Notice: Subject to any disclaimer, the term of this patent is extended or adjusted under 35 U.S.C. 154(b) by 30 days.

(21) Appl. No.: 15/537,248

(22) PCT Filed: Feb. 26, 2016

(86) PCT No.: PCT/EP2016/054105
§ 371 (c)(1),
(2) Date: Jun. 16, 2017

(87) PCT Pub. No.: WO2016/135302
PCT Pub. Date: Sep. 1, 2016

(65) Prior Publication Data
US 2017/0355601 A1 Dec. 14, 2017

(30) Foreign Application Priority Data
Feb. 27, 2015 (EP) .................................... 15156956

(51) Int. Cl.
*C01B 3/14* (2006.01)
*B01J 8/04* (2006.01)

(52) U.S. Cl.
CPC ............... *C01B 3/14* (2013.01); *B01J 8/0446* (2013.01); *B01J 8/0496* (2013.01);
(Continued)

(58) Field of Classification Search
CPC ...... C01B 3/14; C01B 3/16; C01B 2203/1205; C01B 2203/0888; C01B 2203/1052;
(Continued)

(56) References Cited

U.S. PATENT DOCUMENTS 3,595,619 A 7/1971 Slater et al.
4,161,393 A 7/1979 Rudolph et al.
(Continued)

FOREIGN PATENT DOCUMENTS

EP 1 690 826 A2 8/2006
WO WO 2004/062764 A2 7/2004

OTHER PUBLICATIONS

International Search Report with Written Opinion corresponding to International Patent Application No. PCT/EP2016/054105, dated Apr. 29, 2016.
(Continued)

*Primary Examiner* — Anthony J Zimmer
(74) *Attorney, Agent, or Firm* — Leydig, Voit & Mayer, Ltd.

(57) ABSTRACT

The present disclosure relates to a process plant and a process for production of a hydrogen rich gas, comprising the steps of (a) directing an amount of a synthesis gas comprising at least 15%, 50% or 80% on dry basis of CO and $H_2$ in combination, a gas comprising steam, and a recycled intermediate product gas to be combined into a first reactor feed gas, (b) directing said first reactor feed gas to contact a first material catalytically active in water gas shift reaction, producing an intermediate product gas, (c) splitting said intermediate product gas in the recycled intermediate product gas and a remaining intermediate product gas, (d) combining said remaining intermediate product gas with a further amount of synthesis gas forming a second reactor feed gas, (e) directing said second reactor feed gas to contact
(Continued)

a second material catalytically active in the water gas shift reaction, producing a product gas, characterized in the $H_2O:CO$ ratio in said first reactor feed gas being from 0.5 to 2.0 and the $H_2O:CO$ ratio in said second reactor feed gas being from 0.5 to 2.0. with the associated benefit of distributing the heat development and thus reducing the maximum temperature in the reactors by limiting the extent of reaction of the reacting mixture, and thereby reducing the amount of steam required for limiting methanation.

9 Claims, 4 Drawing Sheets

(52) U.S. Cl.
CPC ............... *B01J 2208/00256* (2013.01); *C01B 2203/0288* (2013.01); *C01B 2203/0883* (2013.01); *C01B 2203/0888* (2013.01); *C01B 2203/1052* (2013.01); *C01B 2203/1205* (2013.01); *C01B 2203/82* (2013.01)

(58) Field of Classification Search
CPC ........ C01B 2203/82; C01B 2203/0883; C01B 2203/148; C01B 2203/0288; C01B 2203/0294; B01J 8/0496; B01J 8/0446; B01J 2208/00256; Y02P 20/129
See application file for complete search history.

(56) References Cited

U.S. PATENT DOCUMENTS

| | | | |
|---|---|---|---|
| 8,821,833 B2 | 9/2014 | Hinton et al. | |
| 2003/0046867 A1* | 3/2003 | Woods | B01J 12/007 48/127.9 |
| 2005/0123472 A1* | 6/2005 | Hall | B01J 19/088 423/651 |
| 2011/0229400 A1* | 9/2011 | Guo | C01B 3/323 423/437.1 |
| 2014/0252277 A1* | 9/2014 | Abbott | C01B 3/16 252/373 |

OTHER PUBLICATIONS

Extended European Search Report dated Sep. 9, 2015, corresponding to European Patent Application No. 15156956.3.

* cited by examiner

METHOD FOR PRODUCTION OF A HYDROGEN RICH GAS

CROSS-REFERENCE TO RELATED APPLICATIONS

This application is a 35 U.S.C. § 371 filing of International Application No. PCT/EP2016/054105, filed Feb. 26, 2016, which claims the benefit of and priority to European Patent Application No. 15156956.3, filed Feb. 27, 2015, each of which is hereby incorporated by reference in its entirety.

The present invention relates to a method for production of a hydrogen enriched gas from a synthesis gas. Said method comprises the combined steps of adding steam and recycling product gas, in order to control the gas reactivity.

In the production of hydrogen rich gas, steam is added as a reactant to a synthesis gas comprising CO, which reacts with $H_2O$ to form $H_2$ and $CO_2$ according to the water gas shift reaction. A side reaction—especially at elevated temperatures—is methanation. To limit methanation, excess steam may be added i.e. by keeping a high steam to carbon monoxide (S:CO)-ratio (i.e. above 2).

The extent of methanation increases at elevated temperatures. Therefore if the temperature profile of the reactor is well controlled the methanation may remain negligible and S:CO-ratio can be lowered, resulting in a lower steam addition, and a related reduction of operational cost.

In U.S. Pat. No. 8,821,833 B2, a water gas shift process in a single reactor with recycle is proposed, with the objective of protecting the high temperature shift iron catalyst against excessive temperatures. In this process the recycle gas is having a temperature of 464° C. which will put very high and expensive demands on the compressor driving the recycle, and the temperature may also be excessive for avoiding methane formation. In addition the use of a compressor will be related to a significant cost of operation.

U.S. Pat. No. 4,161,393 discloses a process in multiple reactors with excessive steam addition wherein the downstream reactors receive a portion of the feed gas which has by-passed upstream reactors, such that the heat of reaction is distributed over the two reactors.

U.S. Pat. No. 3,595,619 discloses a process operating in two beds in which the S:CO ratio at the inlet to the first bed is 0.5-4, and the S:CO ratio at the outlet of the first bed is 5-15—and in which further water is added as quench prior to the second bed.

According to the present disclosure it is proposed to distribute the heat release over the reactors by combining the feed gas with a recycled gas and by directing by-passed feed gas to a downstream reactor, such that only a partial conversion occurs in the first reactor. This secures that both reactors are kept below the critical temperature for methanation, while avoiding excess addition of steam. Beneficially the recycle gas may be driven by an ejector, having steam as motive gas, to avoid an increase in operational cost.

DEFINITIONS

In the following the term water gas shift process shall be used for a chemical process in which CO and $H_2O$ reacts to form $H_2$ and $CO_2$.

In the following the term sour shift shall be used for a water gas shift process taking place in the presence of sulfur compounds employing a catalytically active material which is not deactivated by sulfur compounds.

In the following the term concentrations are given on volumetric basis. Where the concentration of sulfur is stated, this shall be the volumetric concentration based on the assumption that all sulfur is present as $H_2S$.

In the following the term synthesis gas or syngas shall be used for a gas in which the combined concentration of CO and $H_2$ is at least 15%.

In the following, where concentrations are stated in % this shall be understood as volumetric (molar) % on a dry basis, unless explicitly stated otherwise.

In the following the module of a synthesis gas is a dimensionless number indicating the balance between CO and $H_2$, and compensating for the presence of $CO_2$ shall be defined as $M=(H_2-CO_2)/(CO+CO_2)$.

In the following references to the periodic table shall be made to the CAS Group definitions. Group VIIIB shall be construed as elements from the periodic table according to the CAS definition, i.e. as the elements of the combined 1990 IUPAC Groups 8, 9 and 10. Similarly Group VI shall be construed as the elements of the combined 1990 IUPAC Group 6.

In the following, where reference is made to a bed or a reactor, this may be understood as equivalent, unless otherwise indicated in the text.

In the following, where reference is made to a process stage, such a stage may be implemented in one or more reactors or reactor beds.

In a broad embodiment, the present disclosure relates to a process for production of a hydrogen rich gas, comprising the steps of (a) directing an amount of a synthesis gas comprising at least 15%, 50% or 80% on dry basis of CO and $H_2$ in combination, a gas comprising steam, and a recycled intermediate product gas to be combined into a first reactor feed gas, (b) directing said first reactor feed gas to contact a first material catalytically active in water gas shift reaction, producing an intermediate product gas, (c) splitting said intermediate product gas in the recycled intermediate product gas and a remaining intermediate product gas, (d) combining said remaining intermediate product gas with a further amount of synthesis gas forming a second reactor feed gas, (e) directing said second reactor feed gas to contact a second material catalytically active in the water gas shift reaction, producing a product gas, characterized in the $H_2O:CO$ ratio in said first reactor feed gas being from 0.5 to 2.0 and the $H_2O:CO$ ratio in said second reactor feed gas being from 0.5 to 2.0, with the associated benefit of distributing the heat development and thus reducing the maximum temperature in the reactors by limiting the extent of reaction of the reacting mixture, and thereby reducing the amount of steam required for limiting methanation.

In a further embodiment the synthesis gas comprises at least 20% and preferably at most 70% CO on dry basis, with the associated benefit of such a synthesis gas being especially suited for providing a final product gas appropriate for production of carbon based molecules such as methanol and methane.

In a further embodiment the first material catalytically active in the water gas shift reaction comprises an element from Group VIb, preferably Mo and a non-noble element from Group VIII, preferably Co, with the associated benefit of such a composition being effective in water gas shift reaction, and the specific benefit of not being deactivated by presence of sulfur in the reacting mixture.

In a further embodiment the second material catalytically active in the water gas shift reaction is different from the first material catalytically active in the water gas shift reaction, with the associated benefit of giving the ability of selecting a material optimal for the conditions in each of said reactors.

In a further embodiment the maximum temperature of the first and the second material catalytically active in the water gas shift reaction is below 500° C., 430° C. or 400° C., with the associated benefit of reducing the amount of side reactions, such as methanation.

In a further embodiment the recycled intermediate product gas is provided as suction gas and the gas comprising steam as motive gas in an ejector, with the associated benefit of providing the energy for driving the recycle gas from the addition of steam, already required as a reactant, and thus avoiding a compressor with moving parts and an operational cost from energy consumption.

In a further embodiment a final product gas is provided by combination of the product gas and an amount of synthesis gas, with the associated benefit of enabling detailed control of the composition of the final product gas, since the composition is independent of the reactivity implied by the gas composition, the catalyst and the temperature.

In a further embodiment the process comprises an additional step of directing a gas comprising at least an amount of said product gas as a third reactor feed gas to contact a third material catalytically active in the water gas shift reaction, producing a product gas, with the associated benefit of such a process comprising a further stage, allowing an increased extent of water gas shift reaction.

In a further embodiment said synthesis gas comprises at least 200 ppm sulfur, with the associated benefit of such a gas not having undergone expensive desulfurization. In a further embodiment, at least one of said intermediate product gas, said recycled intermediate product gas, and said remaining intermediate product gas is cooled in a heat exchanger or a waste heat boiler, with the associated benefit from cooling the intermediate product that the cooled intermediate product may react further in the water gas shift process without the risk of unintended formation of methane.

A further aspect of the present disclosure relates to a process plant for production of a hydrogen rich gas, comprising a first and a second reactor, each of said reactors having an inlet and an outlet, and a first reactor recycle line, said process plant being configured for receiving a first stream of synthesis gas in a line being in fluid communication with the inlet of the first reactor and a second stream of synthesis gas in a line being in fluid communication with the inlet of the second reactor and a stream of steam in a line being in fluid communication with the inlet of the first reactor, where said first reactor is holding a first material catalytically active in the water gas shift reaction, where said second reactor is holding a second material catalytically active in the water gas shift reaction, and where said first reactor recycle line comprises a means for gas pressurization having an inlet and an outlet and said process plant is configured for said outlet from the first reactor to be in fluid communication with the inlet of said means for gas pressurization, and is further configured for said outlet of the means for gas pressurization to be in fluid communication with said first reactor inlet, and is further configured for said second reactor inlet to be fluid communication with said first reactor outlet, and is further configured for withdrawing a hydrogen rich gas from said outlet of said second reactor, with the associated benefit of such a process plant being configured for carrying out a water gas shift process with low steam consumption and low risk of methanation reaction.

In a further embodiment the means for gas pressurization comprises an ejector, having a motive gas inlet, a suction gas inlet and a discharge outlet, in which the motive gas inlet is in fluid communication with said stream of steam, the suction gas inlet is in fluid communication with said first reactor outlet and the discharge outlet is in fluid communication with the inlet of the first reactor, with the associated benefit of such a process plant having low operational cost, compared to an equivalent process plant employing a compressor instead of an ejector.

In a further embodiment the process plant further comprises a means for cooling, such as a heat exchanger or a waste heat boiler, having an inlet and an outlet, the inlet of said means for cooling being in fluid communication with the outlet of said first reactor and the outlet of said means for cooling being in fluid communication with the inlet of said second reactor, with the associated benefit of cooling the intermediate product that the cooled intermediate product may react further in the water gas shift process without the risk of unintended formation of methane.

In a further embodiment the process plant further comprises a third reactor having an inlet and an outlet and comprising a material active in the water gas shift reaction, and a second means for cooling having an inlet and an outlet, the inlet of said second means for cooling being in fluid communication with the outlet of said second reactor and the outlet of said second means for cooling being in fluid communication with the inlet of said third reactor, wherein the hydrogen rich gas from said outlet of said second reactor is an intermediate gas and the outlet of the third reactor is configured for withdrawal of a further hydrogen enriched product gas with the associated benefit of such a further reaction stage of approaching the equilibrium further, while reducing the risk of exceeding the temperature limit.

In many chemical processes hydrogen is a key reactant. Hydrogen may either be required as pure hydrogen, e.g. for hydroprocessing in refineries or in combination with carbon monoxide, e.g. for synthesis of methanol, synthetic natural gas and is part of a synthesis gas provided from gasification in the presence of water of a carbonaceous material or a hydrocarbon. Often the amount of carbon monoxide in the synthesis gas is higher than desired. However, the well-known water gas shift reaction is used to partially or fully "shift" the carbon monoxide in the gas to hydrogen, in the presence of an appropriate catalyst by reaction of the carbon monoxide with water. The present disclosure will typically find use in the processes known as sour shift, which typically employ catalysts comprising cobalt and molybdenum, and which have the benefit of operating at moderate temperatures, and without requiring full sulfur removal form the synthesis gas, but which also have a tendency to form methane instead of hydrogen at elevated temperatures, as a side reaction. Temperature control of water gas shift reaction by processes according to the present disclosure may however also be relevant for other water gas shift catalysts.

The composition of the synthesis gas is dependent on a number of aspects, including the gasifier design. Some examples of the composition are given in Higman, C. and van der Burgt, M. *Gasification*, Elsevier Inc., 2008. Typically the synthesis gas in oxygen fired gasifiers comprises 25-50% $H_2$ and 15-75% CO and $CO_2$ in combination, but other constituents e.g. up to 10% $CH_4$ may also be present. If the gasifier operates on atmospheric air, the composition will naturally be dominated by $N_2$, such that other concentrations are reduced by an approximate factor 5. In addition synthesis gas may also be provided from other processes, such that the composition may vary from the above, but the combined concentration of CO and $H_2$ will be above 15%.

As mentioned the formation of methane is a side reaction of the water gas shift reaction especially over so-called sour shift catalysts since sour shift catalysts typically operate at moderate stoichiometric excess of steam. Methane formation is undesired and various methods have been used to avoid this. The most common measure is to operate the process in two or more adiabatic sections with cooling between the two sections, or in a boiling water cooled reactor. This may be combined with addition of excess steam to further control the reaction.

However, steam addition beyond what is stoichiometrically required for the reaction, is an excess cost during operation, and therefore it is desired to reduce the excess addition of steam. Another way of controlling the reaction temperature has been to by-pass an amount of feed synthesis gas, such that the feed of reactants to the first reactor corresponds to an equilibrium reaction which releases an amount of energy corresponding to an upper temperature limit. Subsequently the cooled product from the first reactor, containing excess steam may be combined with further synthesis gas feed in the second reactor, where it reacts to a second equilibrium, still below the upper temperature limit.

An alternative way of controlling the process is the use of a recycle stream, which has the effect of shifting the equilibrium away from the product, and thus reduces the temperature increase and reduces the residence time. However it is also well known that this has the consequence of requiring an increased volume of catalyst, and therefore an increased investment cost, and therefore the combination of several means of reducing the reactivity have been avoided to avoid excessive cost.

Now according to the present invention a two stage process with effective control of side reactions has been identified. In this two stage process, excess steam is added to the feed of a first reactor, in combination with recycle of the product from the first stage and sequential addition of synthesis gas with the result of good temperature control may be even better controlled and reduced consumption of steam. Surprisingly it has been identified that this process configuration has an overall lower cost, since the reduced operational cost due to the reduced steam consumption more than outweighs the increased investment in catalyst.

In a preferred embodiment the means for pressurizing the recycle stream is an ejector with the added steam as motive gas, which avoids the otherwise significant operational and investment cost of a compressor.

LIST OF ELEMENTS IN THE DRAWINGS

Feed syngas 102, 202, 302, 402
Main stream 106, 206, 306, 406
Bypass to the second bed 108, 308
Feed bypass stream for adjustment 110, 210, 310, 410
Combined feed stream 114, 214, 314, 414
Bypass syngas stream 108, 308
Steam 120, 220, 320, 420
Recycle stream 122, 422
Intermediate product stream 124, 224, 324, 424
Recycled intermediate product stream 126, 426
Remaining intermediate product stream 128, 428
Cooled intermediate product stream 328
Second reactor feed gas stream 130, 230, 330, 430
Product gas stream 132, 232, 332, 432
Shifted and adjusted product stream 136, 236, 336, 436
First water gas shift reactor 150, 250, 350, 450
Waste heat boiler 152, 252, 352, 452
Ejector 154
Second water gas shift reactor 160, 260, 360, 460
Heat exchanger 162, 262, 362, 458, 462
Compressor 456

Figure 1:
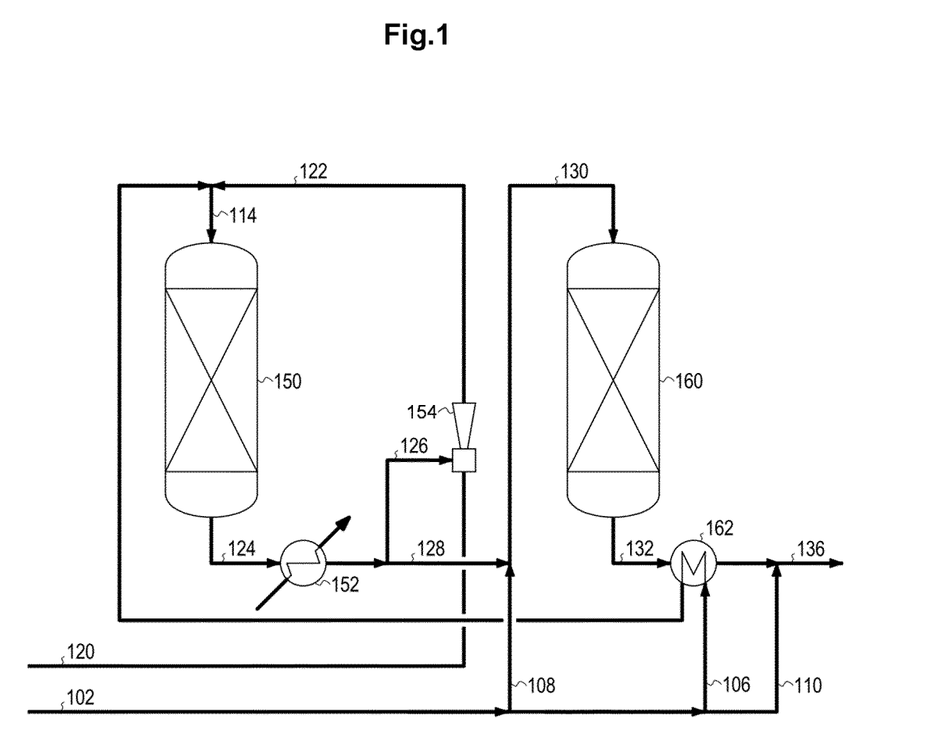
FIG. 1 shows a two stage water gas shift process configuration according to the present disclosure, with sequential synthesis gas addition and recycle driven by an ejector.

FIG. 1 shows a two stage water gas shift process configuration according to the present disclosure, with sequential synthesis gas addition and recycle driven by an ejector. A feed syngas 102 is first split into a main stream 106, a bypass to the second reactor 108, and a feed bypass stream for adjustment 110. The main stream 106 is heated in heat exchanger 162 and combined with a recycle stream 122. The combined feed stream 114 is directed to the first water gas shift reactor 150 followed by cooling of the intermediate product stream 124 in waste heat boiler 152 e.g. with steam production. An amount of the intermediate product stream is recycled 126 around the first reactor is drawn off by ejector 154 using steam 120 as motive stream. The remaining intermediate product stream 128 is combined with the bypass syngas stream 108 to form the second reactor feed gas stream 130 which is directed to the second water gas shift reactor 160. The product gas stream 132 is cooled in heat exchanger 162 before it optionally is combined with the feed bypass stream for adjustment 110 to form the final shifted and adjusted product stream 136.

The combination of the product gas stream 132 with the feed bypass stream for adjustment 110 is optional and may be omitted e.g. if a high module (i.e. a high amount of $H_2$ relative to CO) product gas is required, especially if pure hydrogen is produced.

Figure 2:
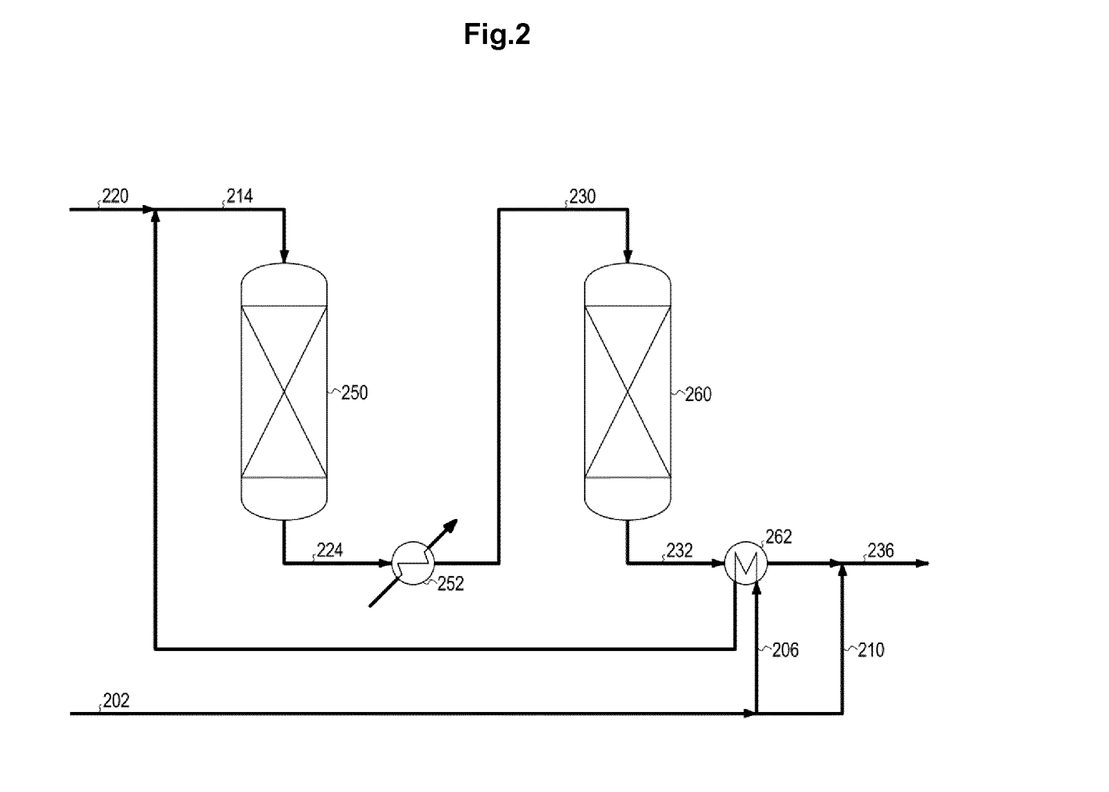
FIG. 2 shows a traditional two stage water gas shift process configuration according to the prior art.

FIG. 2 shows a traditional two stage water gas shift process lay-out according to the prior art. A feed syngas 202 is first split into a main stream 206 and a feed bypass stream 210. The main stream 206 is heated in heat exchanger 262 and combined with a stream of steam 220. The combined feed stream 214 is directed to the first water gas shift reactor 250 followed by cooling of the intermediate product stream 224 in waste heat boiler 252 with steam production. This cooled intermediate product stream is directed to the second water gas shift reactor 260 as a second reactor feed gas stream 230. The product gas stream 232 is cooled in heat exchanger 262 before it is combined with the feed bypass stream for adjustment 210 to form the final shifted and adjusted product stream 236.

Figure 3:
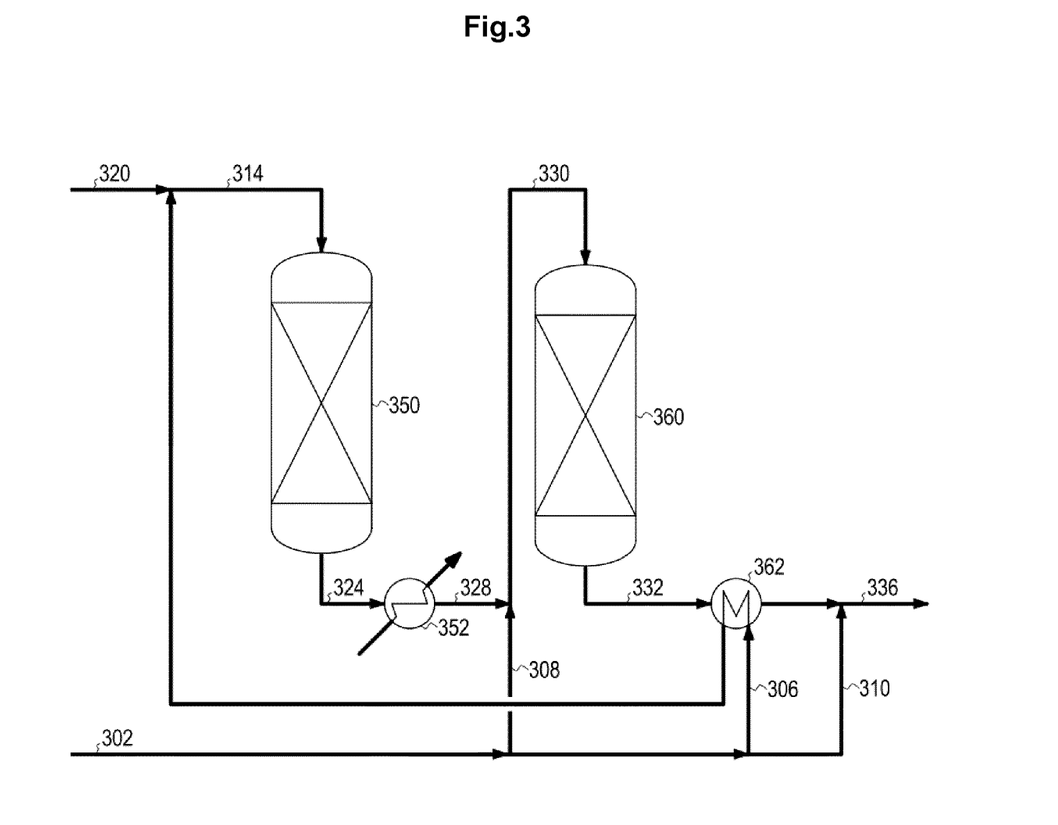
FIG. 3 shows a two stage water gas shift process configuration according to the prior art, with sequential synthesis gas addition.

FIG. 3 shows a two stage water gas shift process lay-out with sequential synthesis gas addition. A feed syngas 302 is first split into a main stream 306, a bypass to the second bed 308, and a feed bypass stream for adjustment 310. The main stream 306 is heated in heat exchanger 362 and combined with a stream of steam 320. The combined feed stream 314 is directed to the first water gas shift reactor 350 followed by cooling of the intermediate product stream 324 in waste heat boiler 352 with steam production. The cooled intermediate product stream 328 is combined with the bypass syngas stream 308 to form the second reactor feed gas stream 330 which is directed to the second water gas shift reactor 360. The product gas stream 332 is cooled in heat exchanger 362 before it is combined with the feed bypass stream for adjustment 310 to form the final shifted and adjusted product stream 336.

Figure 4:
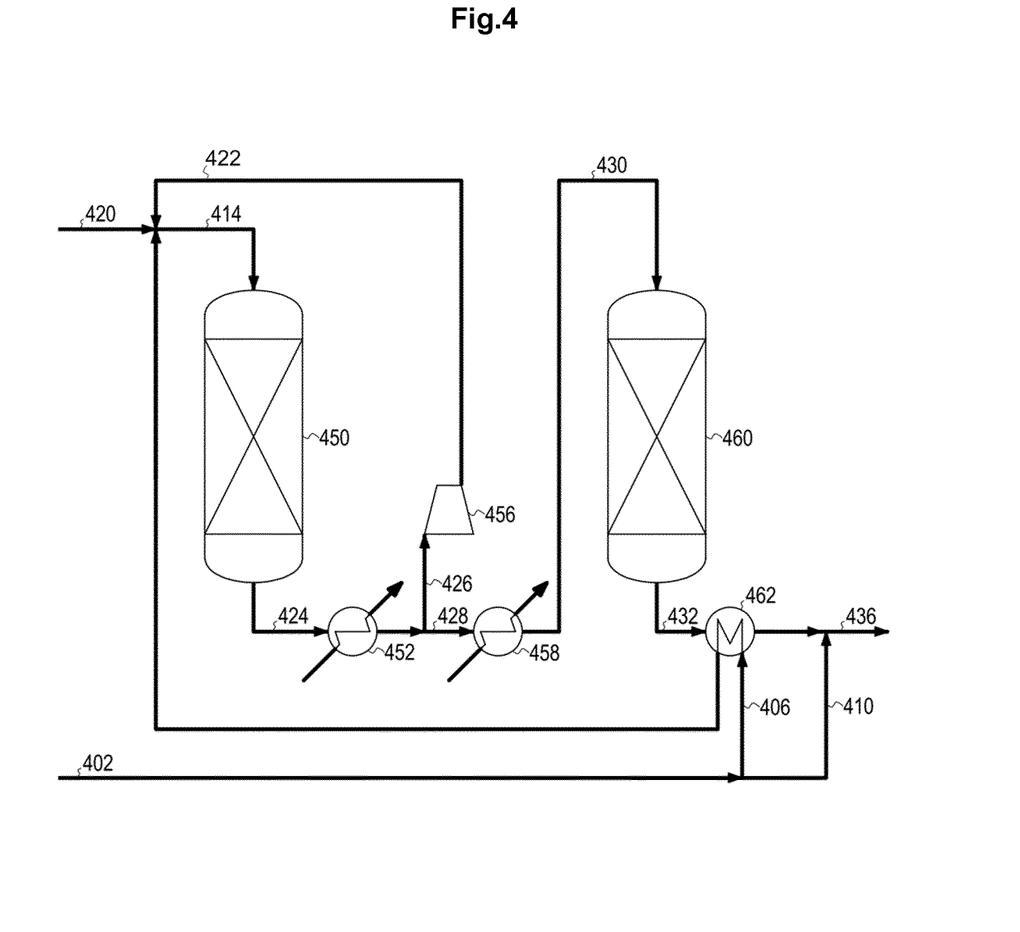
FIG. 4 shows a two stage water gas shift process configuration according to the prior art with recycle driven by a compressor

FIG. 4 shows a two stage water gas shift process configuration according to the prior art with recycle driven by a compressor. A feed syngas 402 is first split into a main stream 406, and a feed bypass stream for adjustment 410. The main stream 406 is heated in heat exchanger 462 and combined with a stream of steam 420 and a recycle stream 422. The combined feed stream 414 is directed to the first water gas shift reactor 450 followed by cooling of the intermediate product stream 424 in waste heat boiler 452 with steam production. An amount of the intermediate product stream is recycled 426 around the first reactor by compressor 456. The remaining intermediate product stream 428 is cooled in heat exchanger 458 to form the second reactor feed gas stream 430 which is directed to the second water gas shift reactor 460. The product gas stream 432 is cooled in heat exchanger 462 before it is combined with the feed bypass stream for adjustment 410 to form the final shifted and adjusted product stream 436.

EXAMPLES

In Table 1, a feed synthesis gas is characterized, corresponding to a synthesis gas from a single stage dry feed gasifier operated at 1500° C. and 30 bar. The feed flow rate is assumed to be 200.000 Nm3/h.

TABLE 1

| Component | Wet molar composition [mole %] |
|---|---|
| $CO_2$ | 1 |
| CO | 61.9 |
| $H_2$ | 32.2 |
| $CH_4$ | 0 |
| $N_2$ + Ar | 2.7 |
| $H_2S$ | 0.3 |
| $H_2O$ | 1.9 |

Four examples of water gas shift processes on the feed synthesis gas of Table 1 have been evaluated. All examples are based on the feed stream described in Table 1, and with the requirement to produce a product gas with module 3, e.g. with the purpose of producing a synthesis gas which is suitable for production of synthetic natural gas. In Table 2 the examples are characterized by the wet molar compositions and temperatures of selected streams. In Table 3 operational characteristics and costs are summarized.

The catalyst volume, steam consumption, and outlet temperatures has been calculated for four different examples to highlight the benefits of the present disclosure, i.e. using the ejector in combination with a bypass. The design criteria are a module of 3 in the product gas and controlling the outlet temperature of the sour shift beds to avoid excessive methane formation. The four examples are described below.

TABLE 2

| | Example 1 | | | | | Example 2 | | | | |
|---|---|---|---|---|---|---|---|---|---|---|
| Stream | 114 | 124 | 130 | 132 | 136 | 214 | 224 | 230 | 232 | 236 |
| Temperature [° C.] | 242 | 419 | 240 | 347 | 302 | 230 | 460 | 240 | 271 | 233 |
| $CO_2$ | 9.9 | 26.6 | 20.0 | 29.6 | 27.6 | 0.4 | 22.6 | 22.6 | 25.8 | 21.5 |
| CO | 22.7 | 6.0 | 20.3 | 10.7 | 14.3 | 26.0 | 3.8 | 3.8 | 0.7 | 11.2 |
| $H_2$ | 26.0 | 42.6 | 39.9 | 49.4 | 48.2 | 13.5 | 35.7 | 35.7 | 38.8 | 37.7 |
| $CH_4$ | 0.02 | 0.04 | 0.03 | 0.09 | 0.09 | 0 | 0.02 | 0.02 | 0.02 | 0.02 |
| $H_2O$ | 39.9 | 23.3 | 17.8 | 8.3 | 7.8 | 58.7 | 36.6 | 36.6 | 33.4 | 28.0 |
| | Example 3 | | | | | Example 4 | | | | |
| Stream | 314 | 324 | 330 | 332 | 336 | 414 | 424 | 430 | 432 | 436 |
| Temperature [° C.] | 230 | 460 | 240 | 360 | 302 | 238 | 460 | 240 | 294 | 225 |
| $CO_2$ | 0.4 | 22.6 | 17.9 | 29.1 | 25.2 | 4.3 | 25.2 | 25.2 | 30.4 | 25.1 |
| CO | 26.0 | 3.8 | 16.5 | 5.3 | 13.1 | 28.4 | 7.4 | 7.4 | 2.3 | 13.0 |
| $H_2$ | 13.5 | 35.7 | 34.9 | 46.1 | 44.2 | 20.5 | 41.3 | 41.3 | 46.4 | 43.9 |
| $CH_4$ | 0 | 0.02 | 0.01 | 0.04 | 0.03 | 0.01 | 0.05 | 0.05 | 0.05 | 0.04 |
| $H_2O$ | 58.8 | 36.7 | 29.0 | 17.8 | 15.6 | 45.3 | 24.4 | 24.4 | 19.3 | 16.2 |

Example 1

Example 1 according to the present disclosure and FIG. 1 shows a two stage sour shift unit, with recycle via an ejector: Recycle around the first reactor to control outlet temperature to the first reactor, sequential addition of synthesis gas to the second reactor and for adjustment of the module in the final product gas. The feed to the ejector is at 280° C.

Example 2

Example 2 according to FIG. 2 and the prior art shows a two stage sour shift unit, with steam addition to control temperature and sequential addition of synthesis gas for adjustment of the module in the final product gas.

Example 3

Example 3 according to FIG. 3 and the prior art shows a two stage sour shift unit, with steam added to control temperature out of the first reactor, and sequential addition of synthesis gas to the second reactor and for adjustment of the module in the final product gas.

Example 4

Example 4 according to FIG. 4 and the prior art shows a two stage sour shift unit, with recycle using a compressor. The feed to the compressor is at 274° C. The energy consumption from the compressor is not included in the operational cost and an excessive investment is also required for a compressor operating at this temperature.

TABLE 3

| Case | S/CO Stage 1 | S/CO Stage 2 | Steam consumption | Catalyst volume | Index cost/yr |
|---|---|---|---|---|---|
| Example 1 | 1.7 | 0.9 | 54% | 155% | 58% |
| Example 2 | 2.3 | 9.6 | 100% | 100% | 100% |
| Example 3 | 2.3 | 1.8 | 70% | 90% | 70% |
| Example 4 | 1.6 | 3.3 | 70% | 123% | 72% |

The key performance metrics and operational costs for the four cases are shown in Table 3. Here it can be seen that the bypass offers both a reduction in catalyst volume and steam consumption in comparison with the 2 stage case of Example 2. The recycle allows for lower steam consumption, however due to the recycle and increased flow rate the catalyst volume increases.

The combination of recycle by ejector and bypass to the second reactor, example 1, allows for even lower steam consumption as well as a lower outlet temperature of the first reactor, and is the only configuration with low S:CO ratio in the feed of both reactors. However, the catalyst volume increases compared with other examples. Therefore the process according to the present disclosure allows for low steam consumption and a low outlet temperature of the first reactor. Furthermore, the operational costs are significantly reduced.

The invention claimed is:
1. A process for production of a hydrogen rich gas, comprising the steps of:
(a) combining an amount of a synthesis gas comprising at least 15 mol % on dry basis of CO and $H_2$ in combination, with the discharge gas of an ejector receiving a gas comprising steam as motive gas, and a recycled intermediate product gas as suction gas, into a first reactor feed gas,
(b) directing said first reactor feed gas to contact a first material catalytically active in water gas shift reaction, producing an intermediate product gas,
(c) splitting said intermediate product gas in the recycled intermediate product gas and a remaining intermediate product gas,
(d) combining said remaining, intermediate product gas with a further amount of synthesis gas forming a second reactor feed gas,
(e) directing said second reactor feed gas to contact a second material catalytically active in the water gas shift reaction, producing a product gas,
characterized in the $H_2O:CO$ ratio in said first reactor feed gas being from 0.5 to 2.0 and the $H_2O:CO$ ratio in said second reactor teed gas being from 0.5 to 2.0.
2. The process according to claim 1 in which said synthesis gas comprises at least 20 mol % on dry basis.
3. The process according to claim 1 in which the first material catalytically active in the water gas shift reaction comprises an element from Group VIb and a non-noble element from Group VIII.
4. The process according to claim 1 in which the second material catalytically active in the water gas shift reaction is different from the first material catalytically active in the water gas shift reaction.
5. The process according to claim 1 in which the maximum temperature of the first and the second material catalytically active in the water gas shift reaction is below 500° C.
6. The process according to claim 1 in which a final product gas is provided by combination of the product gas and an amount of synthesis gas.
7. The process according to claim 1 which comprises an additional step of directing a gas comprising at least an amount of said product gas as a third reactor feed gas to contact a third material catalytically active in the water gas shift reaction, producing a product gas.
8. The process according to claim 1 in which said synthesis gas comprises at least 200 ppm sulfur.
9. The process according to claim 1 in which at least one of said intermediate product gas, said recycled intermediate product gas, and said remaining intermediate product gas is cooled.

* * * * *